United States Patent
Hou et al.

(10) Patent No.: US 9,828,181 B2
(45) Date of Patent: Nov. 28, 2017

(54) STEEL CORD AND CONVEYOR BELT (71) Applicant: The Yokohama Rubber Co., LTD., Minato-ku, Tokyo (JP)

(72) Inventors: Gang Hou, Hiratsuka (JP); Atsushi Miyajima, Hiratsuka (JP); Ryotaro Suefuji, Hiratsuka (JP); Hidehiro Sasakuma, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/323,003

(22) PCT Filed: Jun. 5, 2015

(86) PCT No.: PCT/JP2015/066305
§ 371 (c)(1),
(2) Date: Dec. 29, 2016

(87) PCT Pub. No.: WO2016/002431
PCT Pub. Date: Jan. 7, 2016

(65) Prior Publication Data
US 2017/0144838 A1    May 25, 2017

(30) Foreign Application Priority Data
Jun. 30, 2014   (JP) .................. 2014-133473

(51) Int. Cl.
*B65G 15/36* (2006.01)
*D07B 1/06* (2006.01)
*D07B 1/14* (2006.01)

(52) U.S. Cl.
CPC .......... *B65G 15/36* (2013.01); *D07B 1/0613* (2013.01); *D07B 1/144* (2013.01); *D07B 2201/2058* (2013.01); *D07B 2501/2046* (2013.01); *D07B 2501/2076* (2013.01)

(58) Field of Classification Search
CPC .................................. B65G 15/36; D07B 1/06
USPC ........................................ 198/844.1; 152/556
See application file for complete search history.

(56) References Cited

U.S. PATENT DOCUMENTS 3,776,293 A * 12/1973 Marzocchi ............ B60C 9/0028
152/451
5,712,034 A *  1/1998 Stevens ................. B60C 9/0007
152/451
6,385,957 B2 *  5/2002 Misrachi .............. D07B 1/0673
57/214

(Continued)

FOREIGN PATENT DOCUMENTS

| CN | 103663057 | 3/2014 |
| JP | S54159486 | 12/1979 |

(Continued)

OTHER PUBLICATIONS

International Search Report for International Application No. PCT/JP2015/066305 dated Aug. 18, 2015, 4 pages, Japan.

Primary Examiner — Douglas Hess
(74) Attorney, Agent, or Firm — Thorpe North & Western (57) ABSTRACT

A rubber-reinforcing steel cord embedded in a rubber product has a stranded structure including a core strand, and a plurality of sheath strands intertwined around an outer circumferential surface of the core strand; wherein a lubricant is provided between wires that constitute the core strand.

13 Claims, 6 Drawing Sheets

(56) References Cited

U.S. PATENT DOCUMENTS

| | | | | |
|---|---|---|---|---|
| 6,651,716 | B1 * | 11/2003 | Brown | B29D 30/0633 |
| | | | | 152/564 |
| 7,162,858 | B2 * | 1/2007 | Graham | F16C 1/20 |
| | | | | 57/213 |
| 8,209,949 | B2 * | 7/2012 | Barguet | D07B 1/062 |
| | | | | 57/212 |
| 8,720,176 | B2 * | 5/2014 | Pottier | D07B 1/0633 |
| | | | | 57/213 |
| 8,863,490 | B2 * | 10/2014 | Boisseau | D07B 1/0613 |
| | | | | 57/223 |
| 9,103,068 | B2 * | 8/2015 | Pottier | D07B 1/0626 |
| 9,150,984 | B2 * | 10/2015 | Custodero | D07B 1/062 |
| 2015/0211176 | A1 | 7/2015 | Suefuji | |

FOREIGN PATENT DOCUMENTS

| | | |
|---|---|---|
| JP | S57121682 | 7/1982 |
| JP | S57172098 | 10/1982 |
| JP | 2012036539 | 2/2012 |
| WO | WO 2014/038619 | 3/2014 |

* cited by examiner

STEEL CORD AND CONVEYOR BELT

TECHNICAL FIELD

The present technology relates to a steel cord embedded in a rubber product and a conveyor belt. The present technology particularly relates to a steel cord embedded in a rubber product capable of reducing hysteresis loss attributable to the steel cord when the rubber product is in use and a conveyor belt with the steel cord embedded as a core.

BACKGROUND ART

Steel cords constituted by steel wires intertwined together are used as reinforcing members in tires, conveyor belts, rubber hoses, and other rubber products. A steel cord is known that has a stranded structure of a plurality of sheath strands intertwined around the outer circumferential surface of a core strand (for example, see Japanese Unexamined Patent Application Publication No. 2012-036539A). To manufacture these rubber products, a reinforcing layer formed of an arranged plurality of steel cords is embedded in an unvulcanized rubber member to form a molded article. Thereafter, the molded article is heated at a predetermined temperature and pressurized at a predetermined pressure in a vulcanization process to vulcanize the unvulcanized rubber. Thus, a rubber product embedded with a steel cord reinforcing layer is completed.

When the rubber product is in use, tensile forces and compressive forces act upon the embedded steel cords. The present inventors found that in a rubber product that includes a steel cord with a stranded structure of a plurality of sheath strands intertwined around the outer circumferential surface of a core strand, the wires (steel wires) that constitute the steel cord rub against one another when the rubber product is in use, this rubbing impacting upon hysteresis loss.

For example, in the case of a conveyor belt rubber product, operating with high hysteresis loss results in a problematic increase in the power needed to operate the conveyor belt. Based on their findings, the present inventors performed research and arrived at the present technology, which is capable of reducing hysteresis loss attributable to a steel cord embedded in a rubber product when the rubber product is in use.

SUMMARY

The present technology provide a steel cord embedded in a rubber product capable of reducing hysteresis loss attributable to the steel cord when the rubber product is in use and a conveyor belt with the steel cord embedded as a core.

To achieve the object described above, a rubber-reinforcing steel cord of the present technology is embedded in a rubber product, the steel cord comprising a stranded structure including a core strand, and a plurality of sheath strands intertwined around an outer circumferential surface of the core strand; wherein a lubricant is provided between wires that constitute the core strand.

A conveyor belt of the present technology comprises a plurality of the steel cord described above embedded arranged side by side serving as cores; an unvulcanized upper rubber cover disposed above the cores and an unvulcanized lower rubber cover disposed below the cores; wherein the upper rubber cover and the lower rubber cover with the cores disposed therebetween are vulcanized to manufacture the conveyor belt.

According to the steel cord of the present technology, with the lubricant provided between the wires that constitute the core strand, when the rubber product embedded with the steel cord is in use, the wires that constitute the core strand slide against one another very smoothly. Thus, hysteresis loss of the rubber product attributable to slip resistance between wires can be reduced. Additionally, the core strand is centrally disposed in the steel cord, and thus the lubricant adversely affecting the adhesion between the rubber of the rubber product embedded with the steel cord and the steel cord can be prevented.

According to the conveyor belt of the present technology with the plurality of the steel cords described above embedded arranged side by side serving as cores, hysteresis loss upon operating the conveyor belt can be reduced and thus the power required for operation can be reduced. In other words, the conveyor belt of the present technology operates using less power than conventional conveyor belts, and thus greatly contributes to energy saving.

DETAILED DESCRIPTION

A steel cord and a conveyor belt of the present technology are described below with reference to the embodiments illustrated in the drawings.

Figure 1:
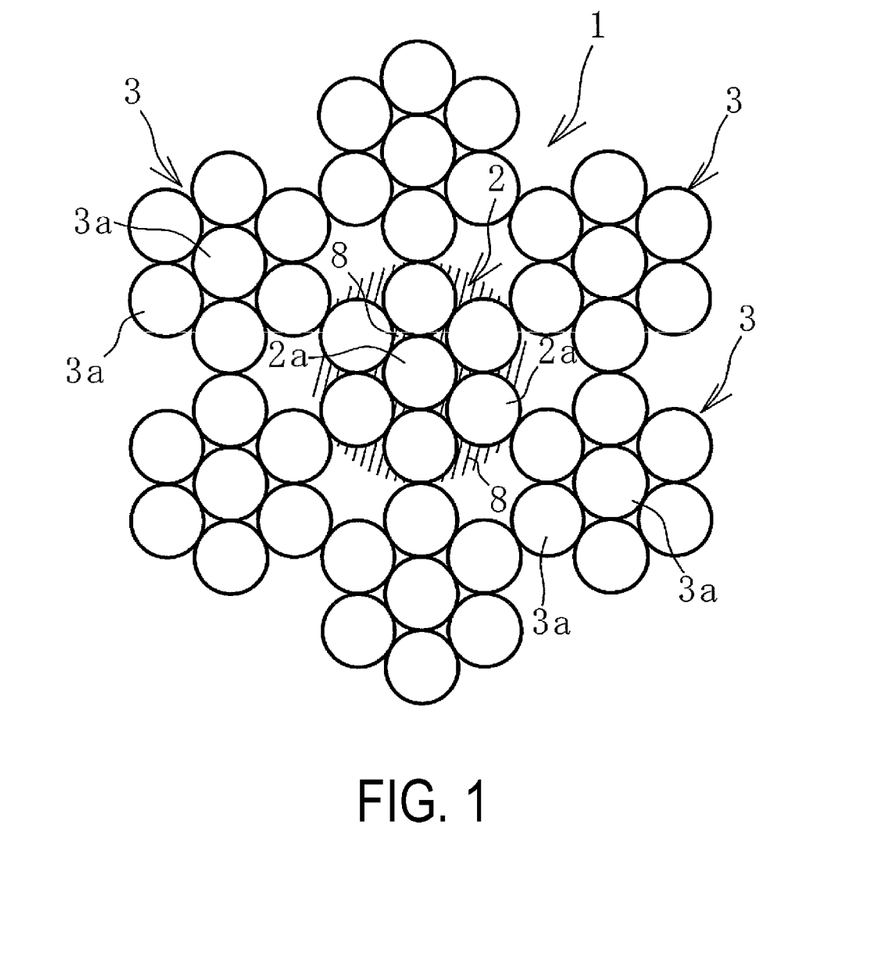
FIG. 1 is a cross-sectional view of a steel cord of the present technology.
Figure 2:
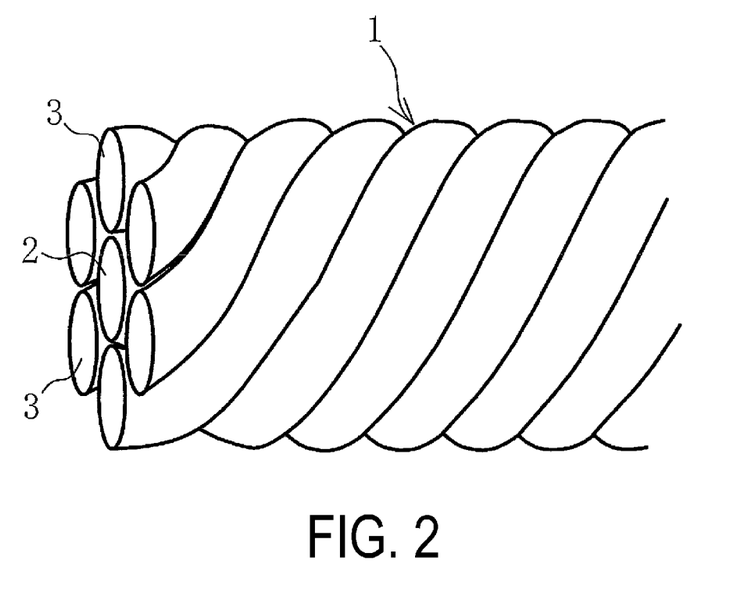
FIG. 2 is a perspective view of the steel cord illustrated in FIG. 1.

A steel cord 1 of the present technology exemplified in FIG. 1 and FIG. 2 is a rubber-reinforcing steel cord 1 embedded in a rubber product. In this embodiment, the steel cord 1 has a stranded structure, or 7×7 structure, of a plurality of sheath strands 3 intertwined around an outer circumferential surface of a core strand 2. The steel cord 1 is formed by six sheath strands 3 intertwined around the outer circumference of one core strand 2. The core strand 2 is formed by six wires 2a intertwined around one central wire 2a. The sheath strands 3 are formed by six wires 3a intertwined around one central wire 3a. The wires 2a, 3a are steel wires.

In this embodiment, the wires 2a that constitute the core strand 2, the wires 3a that constitute the sheath strands 3, and the sheath strands 3 intertwined around the outer circumferential surface of the core strand 2 all share the same twist direction. The wires 2a, 3a have an outer diameter of about from 0.2 mm to 1.0 mm.

In the present technology, lubricant 8 is provided between the wires 2a that constitute the core strand 2. The lubricant 8 is not applied to the surface of the wires 2a, but is provided to fill the spaces between the wires 2a.

With the lubricant 8 provided in such a manner, when the rubber product embedded with the steel cord 1 is in use, for example, when the steel cord 1 bends, the wires 2a slide against one another very smoothly. Thus, hysteresis loss of the rubber product attributable to slip resistance between wires 2a can be reduced. Additionally, the core strand 2 is centrally disposed in the steel cord 1, and thus has little contact with the rubber of the rubber product embedded with the steel cord 1 and the lubricant 8. As a result, adhesion between the steel cord 1 and the rubber in the rubber product can be prevented from being adversely affected by the lubricant 8.

As the lubricant 8, for example, aroma oil can be used. An oil the same type as that blended with the rubber of the rubber product embedded with the steel cord 1 is preferably used. By using such an oil as the lubricant 8, adhesion between the steel cord 1 and the rubber of the rubber product is unlikely to be adversely affected.

The kinematic viscosity at 100° C. of the lubricant 8 is found by measurements performed in accordance with the kinematic viscosity testing method stipulated in JIS (Japanese Industrial Standard) K 2283:2000. A preferable value is, for example, from 54.0 $mm^2/s$ to 64.0 $mm^2/s$, both inclusive. A kinematic viscosity value of less than 54.0 $mm^2/s$ results in the lubricant 8 easily dissipating. A kinematic viscosity of greater than 64.0 $mm^2/s$ hardly allows the slip resistance between the wires 2a to be sufficiently reduced.

A suitable amount (immersion amount) of lubricant 8 to be provided in the steel cord 1 is, for example, 1 $g/cm^3$ or greater. The maximum amount provided is, for example, 2 $g/cm^3$.

Figure 3:
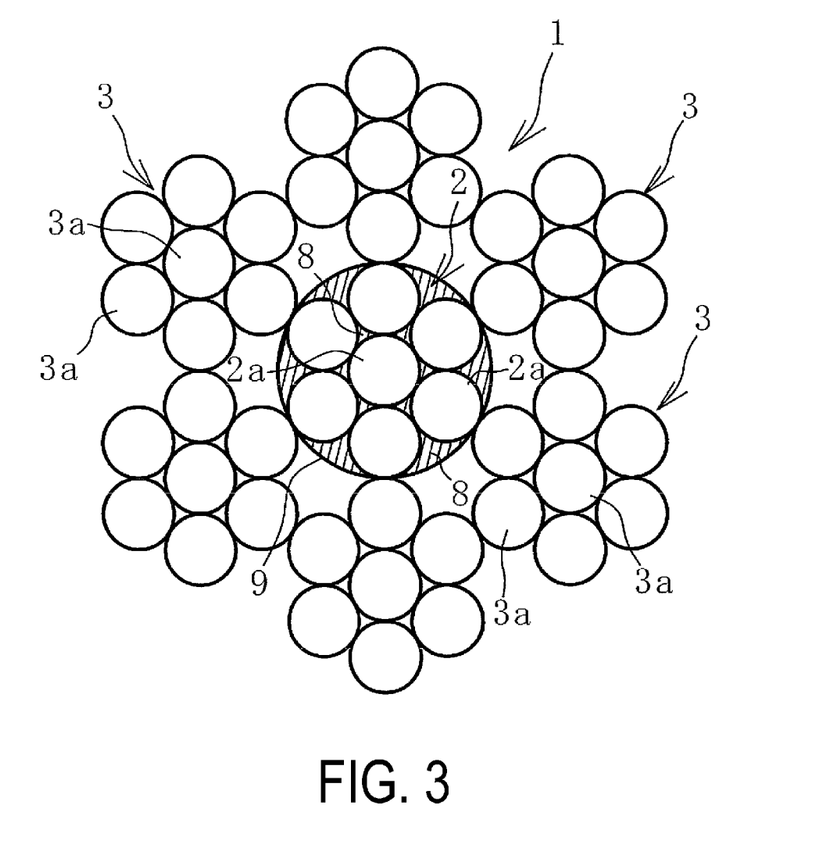
FIG. 3 is a cross-sectional view of a steel cord of another embodiment of the present technology.

The steel cord 1 can also have the configuration of the embodiment exemplified in FIG. 3, in which an adhesive layer 9 covers the outer circumference of the core strand 2. As the adhesive layer 9, an unvulcanized rubber sheet for adhesion can be used. In this configuration, the adhesive layer 9 prevents the provided lubricant 8 from dissipating. As a result, the effects of the lubricant 8 can be secured over a long time. Additionally, the lubricant 8 can be prevented from adversely affecting the adhesion between the steel cord 1 and the rubber of the rubber product.

In the steel cords 1 described above, the lubricant 8 is provided only between the wires 2a that constitute the core strand 2. Furthermore, the steel cord 1 can also have a configuration in which the lubricant 8 is provided between the wires 3a of at least one sheath strand 3 of the plurality of sheath strands 3. This configuration can reduce hysteresis loss of the rubber product attributable to the slip resistance between the wires 3a, and thus can reduce hysteresis loss even further. The steel cord 1 can also have the configuration of the embodiment exemplified in FIG. 4, in which the lubricant 8 is provided between the wires 3a of all of the sheath strands 3.

Figure 4:
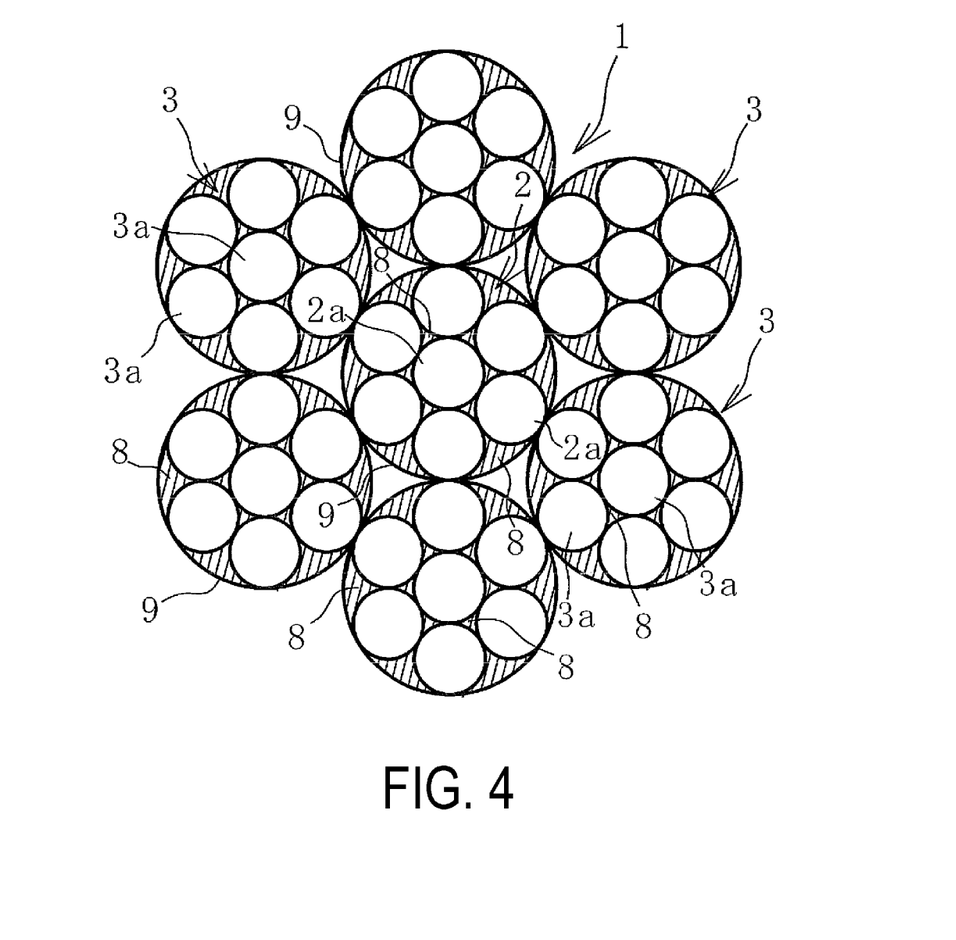
FIG. 4 is a cross-sectional view of a steel cord of yet another embodiment of the present technology.

In the embodiments exemplified in FIG. 3 and FIG. 4, the outer circumferences of the strands 2, 3 provided with the lubricant 8 between the wires 2a, 3a are covered with the adhesive layer 9. However, a configuration without the adhesive layer 9 is also acceptable. The adhesive layer 9 is preferably provided to help prevent the dissipation of the provided lubricant 8.

The steel cord 1 of the present technology is required to be a stranded structure but is not limited to a 7×7 structure. Examples that can be employed include a 7×19 structure, a 19+7×7 structure, and a 7×W(19) structure. Additionally, the wires 2a, the wires 3a, and the sheath strands 3 are not limited to having the same twist direction. Each can have a different twist direction, and the twist direction may be set to a discretionary twist direction.

By shaping the wires 2a that constitute the core strand 2 and the wires 3a that constitute the sheath strands 3, the slip resistance between the wires 2a (3a) is reduced. The shaping ratio of the wires 2a, 3b is preferably 85% or greater. Note that shaping ratio is found by the ratio obtained by dividing the size of the spirally shape of the wires (wave height) by the diameter of the strand.

Figure 5:
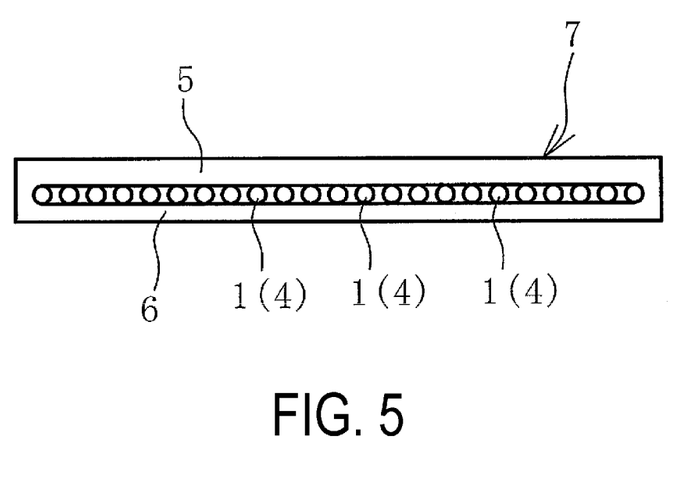
FIG. 5 is a cross-sectional view of a conveyor belt of the present technology.
Figure 6:
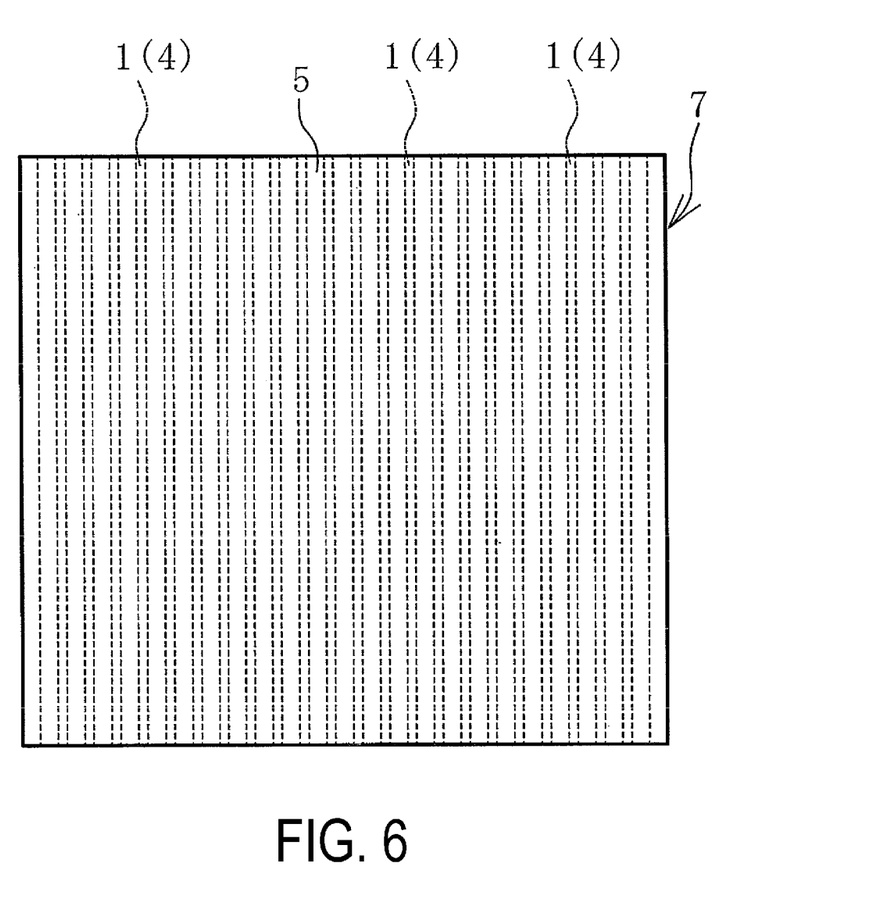
FIG. 6 is a plan view of the conveyor belt illustrated in FIG. 5.

A conveyor belt 7 of the present technology exemplified in FIG. 5 and FIG. 6 is embedded with a plurality of steel cords 1 of the present technology arranged side by side serving as cores 4. The steel cords 1 are oriented in the longitudinal direction of the conveyor belt 7 and embedded between an upper rubber cover 5 and a lower rubber cover 6. In other words, the steel cords 1 serving as the cores 4 are disposed between the upper rubber cover 5 and the lower rubber cover 6, arranged with predetermined intervals therebetween in the belt width direction. Typically, rubber for adhesion is disposed between the cores 4 and between the layer of cores 4 formed of orientated steel cords 1 and the upper rubber cover 5 and lower rubber cover 6. The conveyor belt 7 is manufactured by vulcanizing the unvulcanized upper rubber cover 5 and the lower rubber cover 6 with the cores 4 disposed therebetween.

When the conveyor belt 7 of the present technology is slung around pulleys and operated, tensile forces and compressive forces act on the cores 4 repeatedly. In the conveyor belt 7, the lubricant 8 is provided in the gaps between the wires 2a (3a) that constitute that cores 4. Thus, when the conveyor belt 7 is operated, the wires 2a (3a) slide against one another very smoothly and without resistance. As a result, hysteresis loss attributable to the cores 4 when the conveyor belt 7 is operated is reduced.

According to this conveyor belt 7 with reduced hysteresis loss, the power required for operating the conveyor belt 7 is reduced, thus the conveyor belt 7 can be operated with less power than conventional conveyor belts. This greatly contributes to energy saving.

The rubber product in which the steel cord 1 of the present technology is embedded is not limited to the conveyor belt 7 and may be used in various rubber products in which the steel cord 1 may be embedded as a reinforcing member such as tires, rubber hoses, marine hoses, fenders, and the like.

EXAMPLES

7×7 structured steel cords (4 mm cord diameter) were used to prepare samples (Cord Working Examples 1 to 3) in which three lubricants with differing kinematic viscosities were provided between the wires that constituted the core strand; and 7×7 structured steel cords (4 mm cord diameter) were used to prepare a sample (Cord Conventional Example) in which a lubricant was not provided. Each of these samples were embedded in an unvulcanized rubber, then the rubber was vulcanized. The Cord Working Examples 1 to 3 used aroma oils with differing kinematic viscosity as the provided lubricant. The kinematic viscosities of the three aroma oils were 8 $mm^2/s$ at 40° C., 55 $mm^2/s$ at 40° C., and 55 $mm^2/s$ at 100° C. The amount of the lubricant provided (immersion amount) to the steel cords 1 was from 1 $g/cm^3$ to 2 $g/cm^3$, both inclusive. Next, a steel cord sample was taken from each of the vulcanized rubbers. Using samples of a predetermined length, a predetermined bending test was performed to measure hysteresis loss. The measurement results are shown in Table 1. Note that the measurement results shown in Table 1 are of steel cords with a configuration in which the wires that constitute the strands, the wires that constitute the sheath strands, and the sheath strands intertwined around the outer circumferential surface of the core strands have the same twist direction. However, steel cords with a configuration in which the twist direction is varied with discretion had substantially the same measurement results.

Hysteresis Loss

Hysteresis loss was evaluated using index values, with the hysteresis loss of the Cord Conventional Example taken as the reference value of 100. Lower index values indicate lower hysteresis loss.

TABLE 1

|  | Hysteresis loss (index value) |
| --- | --- |
| Cord Conventional Example | 100 |
| Cord Working Example 1 | 95 |
| Cord Working Example 2 | 64 |
| Cord Working Example 3 | 62 |

As seen from the results shown in Table 1, the Cord Working Examples 1 to 3 had less hysteresis loss than the Cord Conventional Example.

The invention claimed is:

1. A rubber-reinforcing steel cord embedded in a rubber product, the steel cord comprising:
    a stranded structure including:
    a core strand comprising wires, and
    a plurality of sheath strands intertwined around an outer circumferential surface of the core strand; wherein
    a lubricant is provided between the wires that constitute the core strand.

2. The steel cord according to claim 1, wherein the lubricant is provided between wires that constitute at least one sheath strand of the plurality of sheath strands.

3. The steel cord according to claim 2, wherein an outer circumference of the strand having the lubricant provided between the wires is covered with an adhesive layer.

4. A conveyor belt, comprising:
    a plurality of the steel cord described in claim 2 embedded arranged side by side serving as cores;
    an unvulcanized upper rubber cover disposed above the cores and an unvulcanized lower rubber cover disposed below the cores; wherein
    the upper rubber cover and the lower rubber cover with the cores disposed therebetween are vulcanized to manufacture the conveyor belt.

5. The steel cord according to claim 1, wherein an outer circumference of the strand having the lubricant provided between the wires is covered with an adhesive layer.

6. The steel cord according to claim 5, wherein wires that constitute the core strand and the sheath strands have a shaping ratio of 85% or greater.

7. A conveyor belt, comprising:
    a plurality of the steel cord described in claim 5 embedded arranged side by side serving as cores;
    an unvulcanized upper rubber cover disposed above the cores and an unvulcanized lower rubber cover disposed below the cores; wherein
    the upper rubber cover and the lower rubber cover with the cores disposed therebetween are vulcanized to manufacture the conveyor belt.

8. The steel cord according to claim 1, wherein wires that constitute the core strand and the sheath strands have a shaping ratio of 85% or greater.

9. The steel cord according to claim 8, wherein the lubricant has a kinematic viscosity at 100° C. from 54.0 $mm^2/s$ to 64.0 $mm^2/s$, both inclusive.

10. A conveyor belt, comprising:
    a plurality of the steel cord described in claim 8 embedded arranged side by side serving as cores;
    an unvulcanized upper rubber cover disposed above the cores and an unvulcanized lower rubber cover disposed below the cores; wherein
    the upper rubber cover and the lower rubber cover with the cores disposed therebetween are vulcanized to manufacture the conveyor belt.

11. The steel cord according to claim 1, wherein the lubricant has a kinematic viscosity at 100° C. from 54.0 $mm^2/s$ to 64.0 $mm^2/s$, both inclusive.

12. A conveyor belt, comprising:
    a plurality of the steel cord described in claim 11 embedded arranged side by side serving as cores;
    an unvulcanized upper rubber cover disposed above the cores and an unvulcanized lower rubber cover disposed below the cores; wherein
    the upper rubber cover and the lower rubber cover with the cores disposed therebetween are vulcanized to manufacture the conveyor belt.

13. A conveyor belt, comprising:
    a plurality of the steel cord described in claim 1 embedded arranged side by side serving as cores;
    an unvulcanized upper rubber cover disposed above the cores and an unvulcanized lower rubber cover disposed below the cores; wherein
    the upper rubber cover and the lower rubber cover with the cores disposed therebetween are vulcanized to manufacture the conveyor belt.

\* \* \* \* \*